US012433498B2

(12) United States Patent
Shin et al.

(10) Patent No.: US 12,433,498 B2
(45) Date of Patent: Oct. 7, 2025

(54) HEART BEAT MEASUREMENTS USING A MOBILE DEVICE

(71) Applicant: Google LLC, Mountain View, CA (US)

(72) Inventors: Dongeek Shin, San Jose, CA (US); Ivan Poupyrev, Mountain View, CA (US); Brandon Barbello, Mountain View, CA (US); Shwetak Patel, Mountain View, CA (US)

(73) Assignee: Google LLC, Mountain View, CA (US)

( * ) Notice: Subject to any disclaimer, the term of this patent is extended or adjusted under 35 U.S.C. 154(b) by 395 days.

(21) Appl. No.: 17/784,038

(22) PCT Filed: Dec. 13, 2019

(86) PCT No.: PCT/US2019/066305
§ 371 (c)(1),
(2) Date: Jun. 9, 2022

(87) PCT Pub. No.: WO2021/118602
PCT Pub. Date: Jun. 17, 2021

(65) Prior Publication Data
US 2023/0014336 A1    Jan. 19, 2023

(51) Int. Cl.
*A61B 5/024* (2006.01)
*A61B 5/00* (2006.01)
(Continued)

(52) U.S. Cl.
CPC ........ *A61B 5/02438* (2013.01); *A61B 5/1102* (2013.01); *A61B 5/6898* (2013.01);
(Continued)

(58) Field of Classification Search
CPC ....... A61B 5/318; A61B 5/0004; A61B 5/021; A61B 5/05; A61B 5/1102; A61B 5/024;
(Continued)

(56) References Cited

U.S. PATENT DOCUMENTS 6,234,982 B1    5/2001    Aruin
6,972,677 B2    12/2005   Coulthard
(Continued)

FOREIGN PATENT DOCUMENTS

AU    2012-308234 A1    5/2014
CN       108700645 A    10/2018
(Continued)

OTHER PUBLICATIONS

International Search Report and Written Opinion for PCT/US2019/065958 dated Aug. 21, 2020, all pages.
(Continued)

*Primary Examiner* — Gerald Johnson
(74) *Attorney, Agent, or Firm* — Kilpatrick Townsend & Stockton LLP (57) ABSTRACT

Various arrangements for performing ballistocardiography using a mobile device are presented. A radar integrated circuit of a mobile device may emit frequency-modulated continuous-wave (FMCW) radar. Reflected radio waves based on the FMCW radar being reflected off objects may be received and used to create a raw radar waterfall. The raw radar waterfall may be analyzed to create a ballistocardiography waveform. Data based on the ballistocardiography waveform may be output, such as to a machine-learning application installed on the mobile device.

15 Claims, 5 Drawing Sheets

(51) Int. Cl.
  *A61B 5/11* (2006.01)
  *G01S 7/41* (2006.01)
  *G01S 13/34* (2006.01)
  *G01S 13/58* (2006.01)
  *G01S 13/88* (2006.01)

(52) U.S. Cl.
  CPC ............ *A61B 5/7267* (2013.01); *G01S 7/414* (2013.01); *G01S 7/415* (2013.01); *G01S 7/417* (2013.01); *G01S 13/34* (2013.01); *G01S 13/583* (2013.01); *G01S 13/88* (2013.01)

(58) Field of Classification Search
  CPC ... A61B 5/02438; A61B 5/6898; G01S 7/411; G01S 7/414; G01S 7/415; G01S 7/417
  See application file for complete search history.

(56) References Cited

U.S. PATENT DOCUMENTS

| | | |
|---|---|---|
| 7,567,200 B1 | 7/2009 | Osterweil |
| 7,956,755 B2 | 6/2011 | Lee et al. |
| 8,520,784 B1 | 8/2013 | Lackey |
| 8,740,793 B2 | 6/2014 | Cuddihy et al. |
| 8,742,935 B2 | 6/2014 | Cuddihy et al. |
| 9,754,471 B2 | 9/2017 | Berezhnyy et al. |
| 10,055,961 B1 | 8/2018 | Johnson et al. |
| 10,058,290 B1 | 8/2018 | Proud |
| 10,206,610 B2 | 2/2019 | Al-Alusi |
| 10,310,073 B1 | 6/2019 | Santra et al. |
| 10,417,923 B2 | 9/2019 | Walter et al. |
| 10,617,330 B1 | 4/2020 | Joshi et al. |
| 10,690,763 B2 | 6/2020 | Shouldice et al. |
| 10,945,659 B1 | 3/2021 | Kahn et al. |
| 11,012,285 B2 | 5/2021 | Chen et al. |
| 11,250,942 B1 | 2/2022 | Ahmad et al. |
| 11,426,120 B2 | 8/2022 | Cho et al. |
| 11,776,374 B2 | 10/2023 | Carr et al. |
| 11,857,331 B1 | 1/2024 | Berme et al. |
| 11,967,217 B1 | 4/2024 | Andrews et al. |
| 2001/0004234 A1 | 6/2001 | Petelenz et al. |
| 2002/0116080 A1 | 8/2002 | Birnbach et al. |
| 2003/0011516 A1 | 1/2003 | Moch |
| 2003/0058111 A1 | 3/2003 | Lee et al. |
| 2003/0058341 A1 | 3/2003 | Brodsky et al. |
| 2005/0264425 A1 | 12/2005 | Sato et al. |
| 2006/0001545 A1 | 1/2006 | Wolf |
| 2006/0145874 A1 | 7/2006 | Fredriksson et al. |
| 2007/0100666 A1 | 5/2007 | Stivoric et al. |
| 2008/0004904 A1 | 1/2008 | Tran |
| 2008/0081657 A1 | 4/2008 | Suzuki et al. |
| 2008/0252445 A1 | 10/2008 | Kolen |
| 2008/0300572 A1 | 12/2008 | Rankers et al. |
| 2009/0091458 A1 | 4/2009 | Deutsch |
| 2010/0102971 A1 | 4/2010 | Virtanen et al. |
| 2010/0153045 A1 | 6/2010 | Teshirogi et al. |
| 2010/0283845 A1 | 11/2010 | Yokochi et al. |
| 2011/0060215 A1 | 3/2011 | Tupin, Jr. et al. |
| 2011/0190594 A1 | 8/2011 | Heit et al. |
| 2011/0273291 A1 | 11/2011 | Adams |
| 2012/0092284 A1* | 4/2012 | Rofougaran ............ G06F 3/017 345/173 |
| 2012/0101411 A1 | 4/2012 | Hausdorff et al. |
| 2012/0101770 A1 | 4/2012 | Grabiner et al. |
| 2013/0030257 A1 | 1/2013 | Nakata et al. |
| 2013/0072807 A1 | 3/2013 | Tran |
| 2013/0172691 A1 | 7/2013 | Tran |
| 2013/0244644 A1 | 9/2013 | Amirijoo et al. |
| 2013/0278465 A1* | 10/2013 | Owen ................ G01S 19/071 342/458 |
| 2013/0303860 A1 | 11/2013 | Bender et al. |
| 2014/0024917 A1 | 1/2014 | McMahon et al. |
| 2014/0266787 A1 | 9/2014 | Tran |
| 2014/0340227 A1 | 11/2014 | Reed, Jr. |
| 2015/0099941 A1 | 4/2015 | Tran |
| 2015/0125832 A1 | 5/2015 | Tran |
| 2015/0219755 A1 | 8/2015 | Borggaard et al. |
| 2015/0301615 A1 | 10/2015 | Kasar et al. |
| 2016/0015315 A1 | 1/2016 | Auphan et al. |
| 2016/0137258 A1 | 5/2016 | Alvarez-Icaza et al. |
| 2016/0203692 A1 | 7/2016 | Ten Kate et al. |
| 2016/0328941 A1 | 11/2016 | Sundholm |
| 2017/0221335 A1 | 8/2017 | Brillaud |
| 2017/0245124 A1 | 8/2017 | Child et al. |
| 2017/0245125 A1 | 8/2017 | Child et al. |
| 2017/0270481 A1 | 9/2017 | Morgenthau et al. |
| 2017/0273635 A1* | 9/2017 | Li ................ A61B 5/7278 |
| 2017/0352240 A1 | 12/2017 | Carlton-Foss |
| 2018/0049669 A1 | 2/2018 | Vu et al. |
| 2018/0078735 A1 | 3/2018 | Dalgleish et al. |
| 2018/0103874 A1 | 4/2018 | Lee et al. |
| 2018/0121861 A1 | 5/2018 | Morgenthau et al. |
| 2018/0151037 A1 | 5/2018 | Morgenthau et al. |
| 2018/0235518 A1 | 8/2018 | Barton |
| 2018/0288694 A1 | 10/2018 | Gordon et al. |
| 2018/0288699 A1 | 10/2018 | Gordon |
| 2018/0288761 A1 | 10/2018 | Gordon et al. |
| 2018/0292523 A1 | 10/2018 | Orenstein et al. |
| 2018/0322351 A1 | 11/2018 | Shaker |
| 2018/0329049 A1 | 11/2018 | Amihood et al. |
| 2018/0330589 A1 | 11/2018 | Horling |
| 2018/0330593 A1 | 11/2018 | Zack et al. |
| 2019/0044485 A1 | 2/2019 | Rao et al. |
| 2019/0099113 A1 | 4/2019 | Roder et al. |
| 2019/0108742 A1 | 4/2019 | Stolbikov et al. |
| 2019/0108913 A1 | 4/2019 | Coke et al. |
| 2019/0118066 A1 | 4/2019 | Cardona et al. |
| 2019/0158340 A1 | 5/2019 | Zhang et al. |
| 2019/0187268 A1 | 6/2019 | Lien et al. |
| 2019/0348209 A1 | 11/2019 | Wen et al. |
| 2019/0391249 A1 | 12/2019 | Takeuchi et al. |
| 2020/0026361 A1* | 1/2020 | Baheti ................ G01S 13/06 |
| 2020/0033470 A1 | 1/2020 | Brankovic et al. |
| 2020/0034739 A1* | 1/2020 | Chung ................ G16H 40/63 |
| 2020/0090484 A1 | 3/2020 | Chen et al. |
| 2020/0105115 A1 | 4/2020 | Habeeb |
| 2020/0146550 A1 | 5/2020 | Tunnell et al. |
| 2020/0178892 A1 | 6/2020 | Maslik et al. |
| 2020/0191913 A1 | 6/2020 | Zhang et al. |
| 2020/0195327 A1 | 6/2020 | Thiagarajan et al. |
| 2020/0234030 A1 | 7/2020 | Baheti et al. |
| 2020/0237252 A1 | 7/2020 | Lane et al. |
| 2020/0253508 A1 | 8/2020 | Campbell |
| 2020/0284901 A1 | 9/2020 | Tierney et al. |
| 2020/0341457 A1 | 10/2020 | Prugh et al. |
| 2020/0367810 A1 | 11/2020 | Shouldice et al. |
| 2020/0408876 A1 | 12/2020 | Weber et al. |
| 2020/0408879 A1 | 12/2020 | Mayer et al. |
| 2020/0410072 A1 | 12/2020 | Giusti et al. |
| 2021/0030276 A1 | 2/2021 | Li et al. |
| 2021/0037315 A1 | 2/2021 | Eckert et al. |
| 2021/0041523 A1 | 2/2021 | Murthy et al. |
| 2021/0088643 A1 | 3/2021 | Hayashi et al. |
| 2021/0142894 A1 | 5/2021 | Raisanen |
| 2021/0150873 A1 | 5/2021 | Shouldice et al. |
| 2021/0166005 A1 | 6/2021 | Kimura et al. |
| 2021/0217288 A1 | 7/2021 | Sundholm |
| 2021/0244352 A1 | 8/2021 | Campbell et al. |
| 2021/0275056 A1* | 9/2021 | McMahon ............ A61B 5/11 |
| 2021/0322856 A1 | 10/2021 | Virkar et al. |
| 2022/0007965 A1 | 1/2022 | Tiron et al. |
| 2022/0007970 A1 | 1/2022 | Almeida |
| 2022/0058971 A1 | 2/2022 | Mankodi et al. |
| 2022/0361810 A1 | 11/2022 | Price |
| 2023/0000377 A1 | 1/2023 | Wu et al. |
| 2023/0039666 A1 | 2/2023 | Hevdeli et al. |
| 2023/0042452 A1 | 2/2023 | Amir |
| 2023/0419672 A1 | 12/2023 | Prendergast et al. |
| 2024/0115202 A1 | 4/2024 | Tran |

FOREIGN PATENT DOCUMENTS

| | | |
|---|---|---|
| CN | 108877126 A | 11/2018 |
| CN | 109303556 A | 2/2019 |

(56) References Cited

FOREIGN PATENT DOCUMENTS

| | | | |
|---|---|---|---|
| CN | 111190183 A | 5/2020 | |
| CN | 111481184 A | 8/2020 | |
| DE | 102018105875 A1 | 9/2019 | |
| DE | 102018210083 A1 | 12/2019 | |
| EP | 3511732 A2 | 7/2019 | |
| JP | 2009528859 A | 8/2009 | |
| JP | 2014039586 A | 3/2014 | |
| JP | 2014516681 A | 7/2014 | |
| JP | 2015533567 A | 11/2015 | |
| JP | 2016005596 A | 1/2016 | |
| JP | 2016035443 A | 3/2016 | |
| JP | 2016135194 A | 7/2016 | |
| JP | 2017181225 A | 10/2017 | |
| JP | 2018503451 A | 2/2018 | |
| JP | 2019023595 A | 2/2019 | |
| JP | 2019048033 A | 3/2019 | |
| JP | 2020024185 A | 2/2020 | |
| JP | 2020056629 A | 4/2020 | |
| KR | 20190104484 A | 9/2019 | |
| KR | 20200103749 A | 9/2020 | |
| WO | 2009/105418 A1 | 8/2009 | |
| WO | 2016021236 A1 | 2/2016 | |
| WO | 2018/050913 A1 | 3/2018 | |
| WO | 2018/220087 A1 | 12/2018 | |
| WO | 2018220701 A1 | 12/2018 | |
| WO | 2019005936 A1 | 1/2019 | |
| WO | 2019122413 A1 | 6/2019 | |
| WO | 2019/202385 A1 | 10/2019 | |
| WO | 2019/226956 A1 | 11/2019 | |
| WO | 2019242904 A1 | 12/2019 | |
| WO | WO-2020012455 A1 * | 1/2020 | ........... A61B 5/0002 |
| WO | 2020049648 A1 | 3/2020 | |
| WO | 2020104465 A2 | 5/2020 | |
| WO | 2020/226638 A1 | 11/2020 | |
| WO | 2021107958 A1 | 3/2021 | |
| WO | 2021126209 A1 | 6/2021 | |
| WO | 2021/137120 A1 | 7/2021 | |
| WO | 2021177956 A1 | 9/2021 | |
| WO | 2022006183 A1 | 1/2022 | |

OTHER PUBLICATIONS

International Search Report and Written Opinion for PCT/US2020/051776 dated Jun. 18, 2021, all pages.

International Search Report and Written Opinion for PCT/US2020/048388 mailed Apr. 30, 2021, 20 pages.

Yang. F., et al., "EM techniques for the detection of breast cancer," 2010 IEEE Antennas and Propagation Society International Symposium, (Year 2010), pp. 1-4, doi: 10.1109/APS.2010.5562289.

"S+ by ResMed" [Web page], (n.d.). Retrieved on Jul. 10, 2020 from https://splus.resmed.com/ , 9 pages.

"X4" (n.d.). Retrieved on Jul. 10, 2020 from Novelda website https://novelda.com/x4-soc.html, 3 pages.

"Novelda Presence Sensor" (n.d.). Retrieved on Aug. 13, 2020 from Novelda website https://novelda.com/novelda-presence-sensor.html, 1 page.

"A World Leader Within Ultra Wideband (UWB) Sensing", (n.d.). Retrieved on Aug. 14, 2020 from Novelda website https://novelda.com/, 2 pages.

Tran, V.P., et al., "Doppler Radar-Based Non-Contact Health Monitoring for Obstructive Sleep Apnea Diagnosis: A Comprehensive Review", Big Data and Cognitive Computing, vol. 3, Issue 1, Jan. 1, 2019, DOI: 10.3390/bdcc3010003, 21 pages.

International Search Report and Written Opinion for PCT/US2021/040643 mailed Dec. 13, 2021, all pages.

International Search Report and Written Opinion for PCT/US2019/066305 mailed Sep. 10, 2020, all pages.

* cited by examiner

HEART BEAT MEASUREMENTS USING A MOBILE DEVICE

CROSS-REFERENCE TO RELATED APPLICATION

This application is a 371 National Stage filing of PCT Application No. PCT/US2019/066305, filed Dec. 13, 2019, and titled "HEART BEAT MEASUREMENTS USING A MOBILE DEVICE."

BACKGROUND

Measuring the activity of a user's heart can be useful for multiple reasons. First, a heart rate, such as beats per minute (BPM) can be useful for understanding the level of exertion during physical activity or characteristics of the user's health based on resting heart rate. Second, if the accuracy with which the user's heart activity is monitored is high, it may be possible to detect various problems or characteristics that should be monitored or checked by a medical professional.

However, a user may not want to wear or carry a specialized device that monitors the user's heart. For example, while chest monitors, arm bands, headphones, and some smart watches can monitor heart rate (such as using an electrocardiogram), a user may not wish to wear such devices or may occasionally forget to put them on. Further, the accuracy of data obtained using such devices may not be high enough to assess characteristics other the user's heartrate.

SUMMARY

Various embodiments of a smartphone are presented. The smartphone can include a housing and a display screen housed by the housing. The smartphone can include a radar integrated circuit housed by the housing such that an antenna array of the radar integrated circuit is configured to emits radio waves into an ambient environment of the smartphone in front of the display screen and the radar integrated circuit is configured to receive reflected radio waves from the ambient environment. The radar IC may output a raw radar waterfall based on the received reflected radio waves. The smartphone can include one or more processors that are in communication with the display screen and the radar integrated circuit. The one or more processors may receive the raw radar waterfall from the radar integrated circuit. The one or more processors may analyze the raw radar waterfall to create a ballistocardiography waveform. The one or more processors may output data based on the ballistocardiography waveform.

Embodiments of such a smartphone can include one or more of the following features: The one or more processors may perform a background clutter removal process that removes radar data from the raw radar waterfall attributed to a static object to create a foreground radar waterfall. The one or more processors may determine phases of foreground chirp frames present within the foreground radar waterfall. The one or more processors may create the ballistocardiography waveform based on the phases of foreground chirp frames present within the foreground radar waterfall. The radar integrated circuit may be located behind a top bezel of the housing of the smartphone. The radar integrated circuit may emit frequency-modulated continuous-wave radar (FMCW). The data based on the ballistocardiography waveform may be output to an application executed by the smartphone. The application may include a machine learning component that is trained to detect a heart condition based on the ballistocardiography waveform. The ballistocardiography waveform may be presented on the display screen of the smartphone. The one or more processors may be configured to analyze the ballistocardiography waveform to determine a heartrate. The one or more processors being configured to output data based on the ballistocardiography waveform may include outputting the heartrate. The smartphone may include a proximity sensor, wherein the one or more processors are further configured to determine a front surface of the smartphone through which the antenna array of the radar integrated circuit is pointed to the ambient environment is placed against a body part of a user.

In some embodiments, a method for performing ballistocardiography is presented. The method can include emitting, by a radar integrated circuit of a mobile device, frequency-modulated continuous-wave (FMCW) radar. The method can include receiving, by the radar integrated of the mobile device, reflected radio waves based on the FMCW radar being reflected off objects to create a raw radar waterfall. The method can include analyzing, by the mobile device, the raw radar waterfall to create a ballistocardiography waveform. The method can include outputting, by the mobile device, data based on the ballistocardiography waveform to a machine-learning application installed on the mobile device. The method can include classifying, using the machine-learning application, the ballistocardiography waveform based on a trained machine-learning model of the machine-learning application. The method can include outputting, by the mobile device, an indication of a classification based on the classifying the ballistocardiography waveform.

In some embodiments, a non-transitory processor-readable medium comprising processor-readable instructions is presented. The non-transitory processor-readable medium may be configured to cause the one or more processors to cause frequency-modulated continuous-wave (FMCW) radio waves to be emitted. The non-transitory processor-readable medium may be configured to cause the one or more processors to create a raw radar waterfall based on the received reflected radio waves. The non-transitory processor-readable medium may be configured to cause the one or more processors to analyze the raw radar waterfall to create a ballistocardiography waveform. The non-transitory processor-readable medium may be configured to cause the one or more processors to output data based on the ballistocardiography waveform.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Ballistocardiography involves measuring the physical movements of the human body based on the pulsing of blood within vessels of the body, such as arteries, veins, and the heart. While electrocardiography (ECG or EKG) relies on measurement of electrical signals associated with excitation of the heart, ballistocardiography can provide a more accurate picture as to a heart's physical movement. For example, which EKG may be sufficient for determining a heartrate, additional heart health data may be discerned using ballistocardiography.

Radar capabilities can be incorporated as part of various mobile devices. For example, a monolithic radar integrated circuit (IC) may be incorporated as part of a smartphone. The radar IC may be used for various sensing functions, such as detecting gestures performed a distance in front of a touchscreen of the smartphone. The radar capabilities may additionally or alternatively be used for various health monitoring functions after consent has been obtained while preserving the privacy of the smartphone's user and other persons nearby. Specifically, a ballistocardiogram (BCG) may be performed by the radar integrated circuit being held against a portion of a consenting person's body that experiences sufficient blood flow. For instance, regions of the human body that experience a high level of blood flow can include: the chest (such as in the region of the heart); the neck; the arms; and the legs.

Embodiments detailed herein detail how a mobile device with integrated radar capabilities can be used to track a consenting user's heart health, including pulse or heartrate after consent has been supplied by the user. When the mobile device is held against a user that has provided consent, a radar waterfall may be created and output by the radar IC representing the raw data captured by the radar IC. The radar waterfall may be analyzed to separate out waterfall data attributed to an object in motion as opposed to waterfall data attributed to stationary objects based upon a comparison over time. Therefore, if a vessel (e.g., artery, vein) of the body is moving due to the user's heart pumping, corresponding data will be included in foreground waterfall data.

The foreground waterfall data can then be analyzed to identify changes in phase in the reflected radio waves. The slight movement of vessels within the human body are large enough to produce a detectable phase shift in reflected radio waves. Based on the changes in phase over time, a ballistocardiogram can be constructed.

Data from the ballistocardiogram can be used locally to determine characteristics of the user's heart health, such as heartrate (e.g., beats per minute). Further, it may be possible to perform more advanced processing for heart conditions. A user can be given the option of consenting to data from the ballistocardiogram being output to a separate component. Data from the ballistocardiogram, following consent being obtained, may be output to an application-layer software component, such as a user-installed application, being executed by the mobile device or being remotely executed by a cloud-based server system. The application may use a machine learning model that was trained to detect one or more heart conditions based on the BCG data received from the software or hardware component that processes the raw radar waterfall data. For instance, based on a large training set, an application may include a machine learning model that has been trained to detect precursors to a heart attack. Data from the user's BCG can be analyzed by the machine learning model of the application to determine the user's risk level for a heart attack. Similar machine learning models can be implemented for one or more other heart-related conditions that can be detected via BCG data.

Further, various features may be incorporated to help insure that the user is consenting to health-related data being collected. First, a user may be required to acknowledge that health monitoring features are to be used on himself or herself only. Second, a user may be presented with a detailed description of how such health data is stored. Further, while the data is being collected, the device may output sound or speech to indicate the function being performed, such as: "Your pulse is being measured, please remain still." Periodically, the user may be requested to renew his or her consent.

Figure 1:
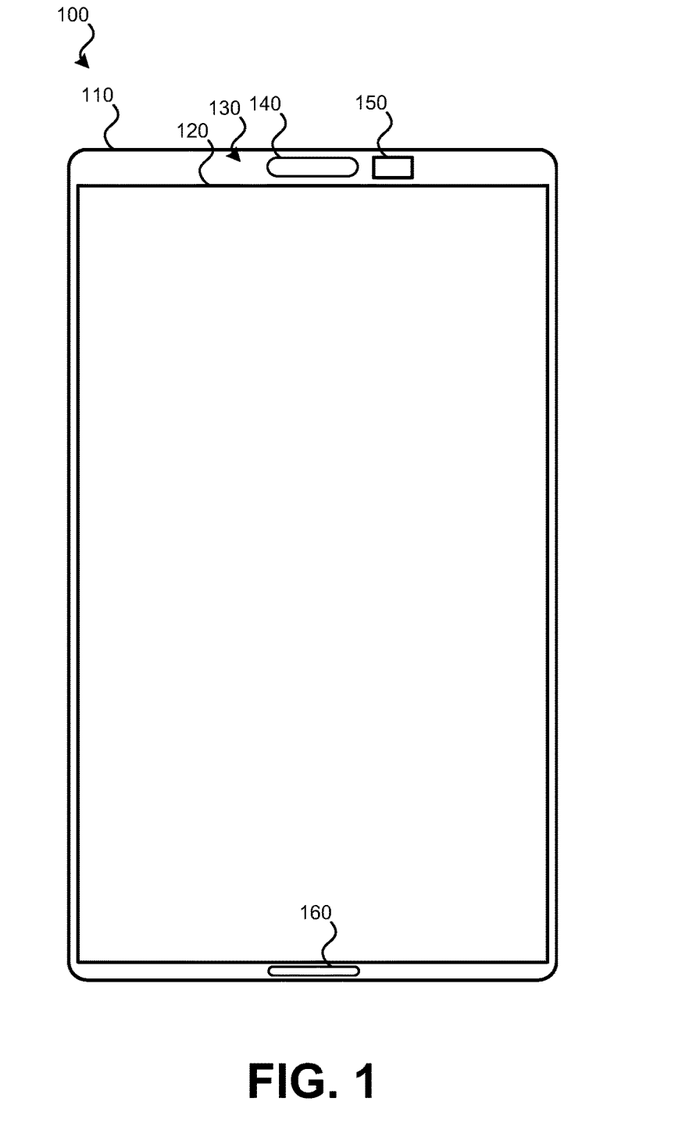
FIG. 1 illustrates an embodiment of a mobile device that can be used to perform heart health measurements.

FIG. 1 illustrates an embodiment of a mobile device 100 that can be used to perform heart health tracking. Mobile device 100 may be a smartphone. Mobile device 100 may include housing 110, touchscreen 120, speaker 140, monolithic radar integrated circuit 150, and microphone 160. Bezel 130 may be located at the top of housing 110. Within bezel 130 of housing 110, may be monolithic radar integrated circuit 150. An integrated antenna array of monolithic radar integrated circuit 150 may be configured to emit radio waves into the ambient environment in front of touchscreen 120. Such arrangement may allow a user to perform gestures in front of touchscreen 120 that can be detected using radar integrated circuit 150. In some embodiments, rather than touchscreen 120 being responsive to touch, a display screen may be present.

In the example of mobile device 100, monolithic radar integrated circuit 150 is located in bezel 130 of housing 110. In other embodiments, radar integrated circuit 150 may be located in some other location on mobile device 100, such as near microphone 160 or on a rear of housing 110 such that monolithic radar integrated circuit 150 emits radio waves into the ambient environment away from the rear of housing 110.

To help preserve privacy, the power of the radar emitted may only permit health information to be discerned when the mobile device is held directly against a user's body (with or without clothing present). Further, in order to obtain BCG data, the user may need to remain relatively motionless for a period of time, such as 5-60 seconds. To further increase privacy, a sound may be output by mobile device 100 while BCG measurements are being made to alert the user that BCG measurements are being made.

In embodiments detailed herein, mobile device 100 may be a smartphone, other forms of mobile devices may perform the functions detailed herein. For example, a gaming device, personal digital assistant, remote control, laptop computer, thermostat, tablet computer, or some other device may have the functionality detailed herein incorporated.

Figure 2:
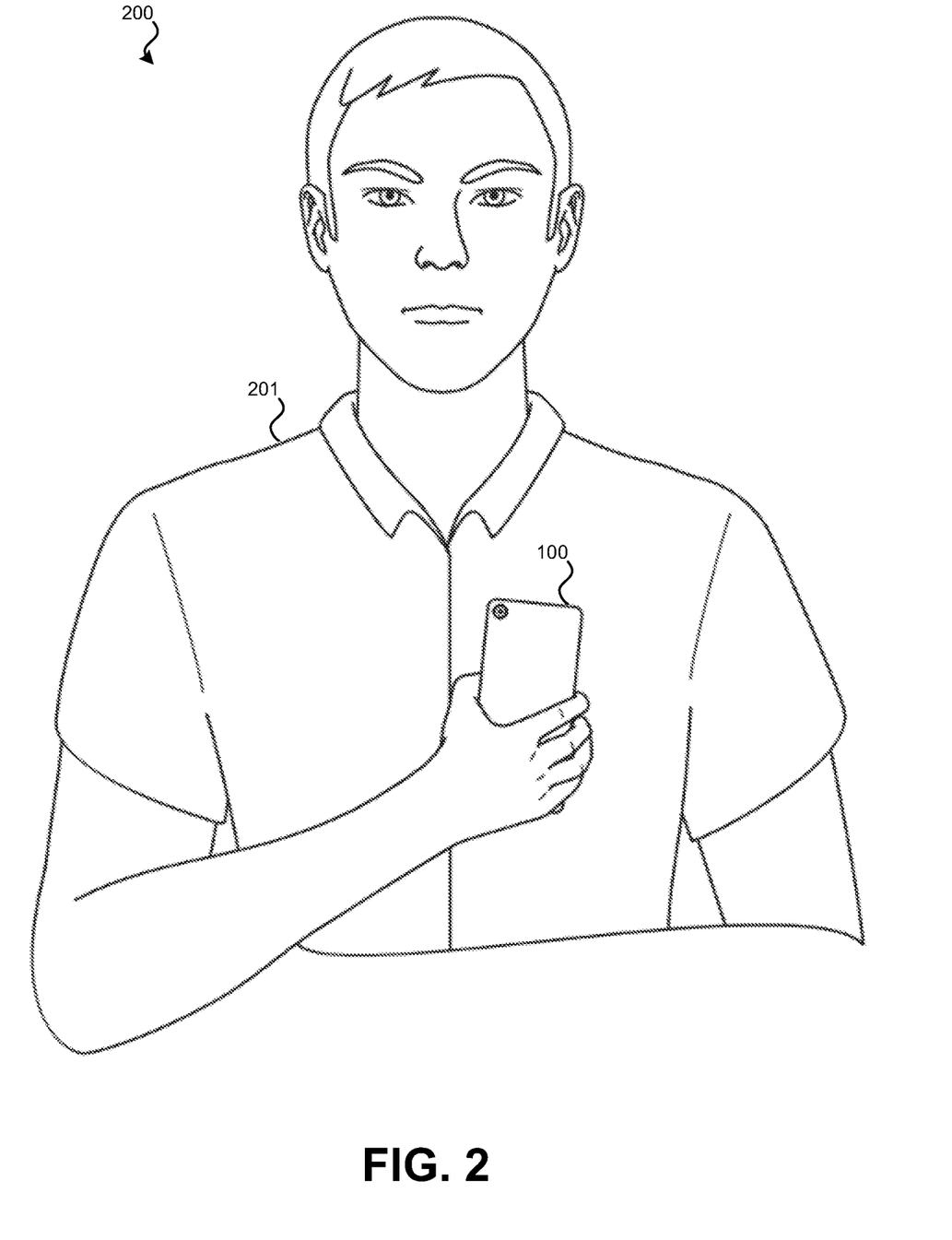
FIG. 2 illustrates an embodiment of a mobile device being used to perform heart health measurements.

FIG. 2 illustrates an embodiment of a mobile device being used to perform heart health tracking. In embodiment 200, mobile device 100 of FIG. 1 is being held by user 201 such that monolithic radar integrated circuit 150 is positioned approximately over the user's heart. User 201 may be pressing the mobile device against his chest such that mobile device 100 stays in a fixed position against the user's chest. By placing mobile device 100 directly against the user's chest, which may or may not include clothing being present between mobile device 100 and the user's chest, a significant portion of sensed motion may be due to internal movement of the user's blood-carrying vessels caused by the user's heart's pumping action. Motion due to breathing, which is at a lower frequency than heart rate (typically breathing frequencies may be 0.2-0.34 Hz) may be filtered out, such as using a digital high-pass filter.

While FIG. 2 illustrates the mobile device being held against the user's chest, it may be possible to hold mobile device 100 against another portion of the user's body and obtain accurate BCG data. The mobile device may be held against the user in any location that exhibits sufficient movement due to the pumping action of the user's heart. For instance, mobile device 100 may be held such that radar integrated circuit 150 is held against the user's neck, arm, or leg.

Figure 3:
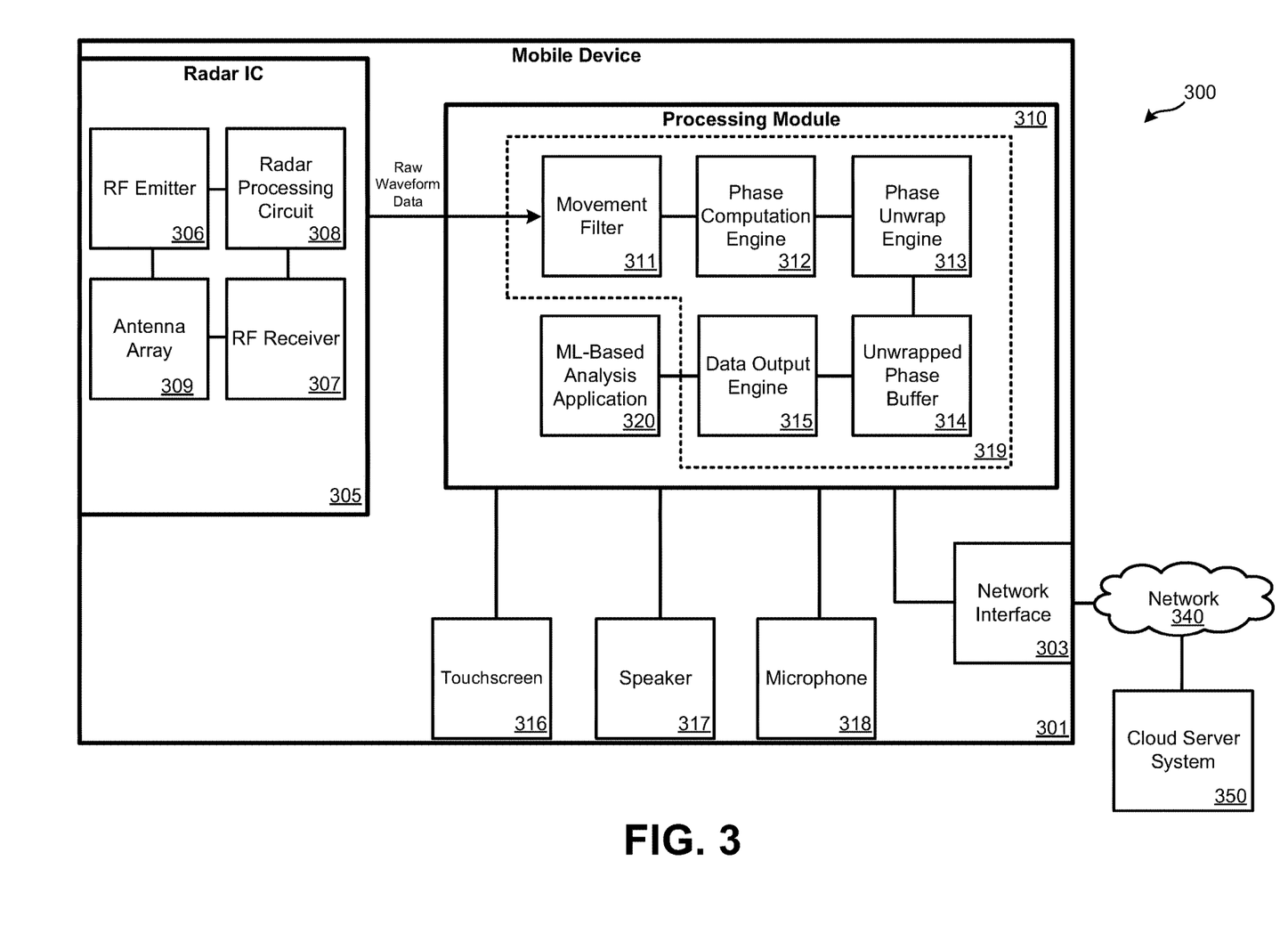
FIG. 3 illustrates a block diagram of an embodiment of a mobile device with heart health measurement capabilities.

FIG. 3 illustrates a block diagram of an embodiment of a heart health tracking system 300 ("system 300"). System 300 can include: mobile device 301; network 340; and cloud server system 350.

Mobile device 301 may be various types of mobile devices, such as a smartphone. Mobile device 301 can represent an embodiment of mobile device 100. Mobile device 301 can include: network interface 303; radar IC 305; processing module 310; touchscreen 316; speaker 317; and microphone 318. Radar IC 305 can represent a monolithic integrated circuit. Therefore, all components of radar IC 305 are implemented within a single package that can be affixed to a printed circuit board of mobile device 301. As an example of radar IC 305, Infineon® BGT60TR13C may be used. Radar IC 305 can include: RF emitter 306; RF receiver 307; radar processing circuit 308; and antenna array 309. Antenna array 309 may be incorporated as part of radar IC 305. Antenna array 309 can include multiple antennas. For example, in some embodiments, two, three, four, or more antennas are included as part of antenna array 309.

RF emitter 306 may generate radio waves or, more generally, electromagnetic radiation, for emission into the ambient environment, the radio waves emitted may be frequency modulated continuous wave (FMCW) radar. Each output chirp of FMCW radar may include variances in frequency (e.g., an increase from a lower to higher frequency) For instance, the generated radio waves may be generated at or around 60 GHz. In other embodiments, the generated electromagnetic radiation may be at a frequency between 40 GHz and 100 GHz or between 50 GHz and 120 GHz. The generated radio waves may be emitted via antenna array 309 or a separate antenna that is part of RF emitter 306. By using such radio frequencies, it may be possible for radar IC 305 to be housed in a small package. For example, radar IC 305 may be 8 mm by 6 mm by 3 mm or smaller. By radar IC 305 being small, it may be possible to incorporate radar IC 305 into many types of mobile devices, such as smartphones, that are relatively small without increasing or significantly increasing the physical size of such mobile devices.

RF receiver 307 may receive separate signals via each antenna of antenna array 309. Radar processing circuit 308, in combination with RF receiver 307, may produce raw waveform data for each antenna of antenna array 309. The raw data produced by radar processing circuit 308 can be referred to as raw waveform data. While it may be possible for radar IC 305 to perform some processing on the raw waveform data locally using radar processing circuit 308, it may also be possible for radar IC 305 to output the raw waveform data for each antenna of antenna array 309 (or a single representative set of waterfall data). In the illustrated embodiment of system 300, the raw waterfall data for each antenna of antenna array 309 is output to processing module 310. Processing module 310 can represent one or more separate integrated circuits from radar IC 305. For heart-related measurements, since the antenna array is placed so close to the user's body, only waterfall data from a single antenna may be used. Alternatively, the data from multiple antennas may be combined.

While the illustrated embodiment of system 300 includes a monolithic IC that performs all of the radar functions, it should be understood that in other embodiments, components of radar IC 305 may be split among multiple components. For example, antenna array 309 may be located separately from RF emitter 306 and/or RF receiver 307.

Mobile device 301 can include network interface 303. Network interface 303 can allow mobile device 301 to communicate via one or more wireless networks. For instance, network interface 303 may allow mobile device 301 to communicate via a wireless local area network, such as a wireless network that operates in accordance with an IEEE 802.11 standard. Network interface 303 may also communicate via one or more mesh networking protocols, such as Thread, Zigbee, or Z-Wave. Other possible wireless interfaces include Bluetooth or a cellular network. One or more cellular interfaces may be present that allow mobile device 301 to communicate with a cellular network.

Network interface 303 may permit mobile device 301 to communicate with network 340. Network 340 can include one or more private and/or public networks, such as the Internet. Network 340 may be used such that mobile device 301 can communicate with the cloud server system 350. Cloud server system 350 may, in some embodiments, perform some of the processing functions performed by processing module 310. For example, the functions of some or all of components 311-316 may be performed by cloud server system 350. Additionally or alternatively, cloud server system 350 may be used to relay notifications and/or store data produced by mobile device 301. For instance, in association with the user account, BCG data created by mobile device 301 may be securely stored by cloud server system 350.

Touchscreen 316, speaker 317, and microphone 318 may permit mobile device 301 to interact directly with a user. In some embodiments, touchscreen 316 may be a display that presents information to the user but does not allow input via touch. For example, after performing BCG measurements, a visual representation of the BCG may be presented and/or calculated characteristics may be presented (such as heart-rate). In some embodiments, mobile device 301 may not have touchscreen 316 (or any form of display screen). For instance, some forms of smart home assistants, which respond to auditory queries, use speech as the primary input and output interfaces. Radar IC 305, in addition to being used for heart health monitoring, can be used to receive input, such as in the form of gestures performed by a user's hand or arm in the field-of-view of antenna array 309.

Microphone 318 can be used for a person to speak to or pose a spoken query to mobile device 301. The spoken query may be analyzed locally or may be transmitted by mobile device 301 to cloud server system 350 for analysis. A result of the spoken query may be transmitted back to mobile device 301 by cloud server system 350 to be output via speaker 317 using recorded or synthesized speech. Speaker 317 and microphone 318 may further be used to interact with a person based on BCG data. For instance, if a user has an elevated heart rate, a question may be posed to the user, such as: "Do you need medical assistance?" If the user responds yes, emergency services may be contacted.

Processing module 310 may include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD). The components that are presented as part of processing module 310 can be implemented as individual hardware and/or software components or may be implemented together, such as in the form of software that is executed by one or more processors.

The raw waveform data received for each antenna received from radar IC 305 may first be processed using movement filter 311. Movement filter 311 may be used to separate static background radar reflections from moving objects. When the user has radar IC 305 pressed to his body, movement may primarily be due to the expanding and contraction of blood vessels caused by the pumping action of the user's heart. Static objects can include bones, clothing, and other objects that are relatively unaffected by the movement of blood within the body. Therefore, movement filter 311 may buffer raw waterfall data for each antenna individually for a rolling time window, such as between one and five seconds. Since static objects can be expected to produce the same radar reflections repeatedly, and adaptive background subtraction process may be performed for each set of raw waterfall data. The output from movement filter 311 may be foreground waterfall data for each antenna. Data included in the foreground waterfall data corresponds to only radar reflections from objects that have moved during the rolling time window.

The output foreground waterfall data for which a set of foreground waterfall data corresponds to each antenna of antenna array 309, may be passed to phase computation engine 312. In some embodiments, if a separate set of foreground waterfall data exists for each antenna, the foreground waterfalls may be combined or all but one of the sets of foreground waterfall data may be discarded.

In an FMCW radar, a signal may be transmitted that is called a chirp. The chirp may be a sinusoid that changes frequency with time. As such, range can be determined based on the time-of-flight of when reflected radar (the receive chirp) is received by the radar IC. Very small displacement changes caused by a heartbeat can be detected by identifying changes in phase between receive chirps in the foreground waterfall data. The phase resolution of radar IC 305 can be high. Equation 1 indicates the half-wavelength phase wrapping of an FMCW receive chirp:

$$\phi(s(R)) = \phi\left(s\left(R + \frac{\lambda}{2}\right)\right) \quad \text{Eq. 1}$$

In Equation 1, $\phi$ is the phase operator that represents an abstraction of a fast Fourier transform-based phase computation, s is the mixed chirp function, R is the point target range, and $\lambda$ is the wavelength of the radio waves. In Equation 1, s( ) can represent a sinusoidal signal function with a message frequency proportional to R. The farther the target, the higher the frequency of s.

Therefore, for a carrier frequency of 60 GHz, Equation 1 indicates that a distance of 2.5 mm is required to wrap phase of the reflected the radio waves. The number of samples made per receive chirp of the received radio waves can then define the minimum amount of shift that can be detected. Equation 2 defines the phase resolution level that can be achieved for a given amount of phase wrap for n samples per receive chirp.

$$\frac{2\pi}{n} \quad \text{Eq. 2}$$

For example, for 2.5 mm of phase wrap and 128 samples being made per receive chirp, 19 µm is the detectable resolution. As another example, if 167 samples are taken per receive chirp, 15 um may be the detectable resolution. Therefore, by varying the frequency and the number of samples taken per receive chirp, the resolution can be adjusted.

For a heartbeat, a chest surface may tend to have a displacement of between 0.2 and 0.5 mm. Therefore, detection of movement of the surface of a user's chest due to a heartbeat is well within the resolution of a system operating at 60 GHz and performing 128 samples per receive chirp.

Phase computation engine 312 may determine the difference in phase of received signal chirps. The difference in phase between receive chirps can be indicative of the amount of displacement of the user's body, such as due to the user's heartbeat. The phase of the signal represented by s( ), relative to the zero phase, can be computed using the angle operator of the fast Fourier transform (FFT). The phase of the target per frame is computed by localizing the phase vector at the range of interest. The difference of the phase of interest over time indicates displacement. The phase of receive chirps present within the foreground waterfall data output by movement filter may shift due to the movement of the user's body due to the user's heartbeat. Filtering may be performed to filter out movement clearly not due to a heartbeat. For instance, a heartbeat may be assumed to be between 40 and 200 beats per minute. Motion having a frequency outside this range (or some other predefined heartbeat range) may be ignored. Phase values may be output by phase computation engine 312 representing the amount of phase change observed in the foreground waterfall data.

Phase unwrap engine 313 may alter the calculated phase values output by phase computation engine 312. The purpose of phase unwrapping can be to include all appropriate multiples of $2\pi$. Integer multiples of $2\pi$ may be added or subtracted from the phase values output by phase computation engine 312 to resolute discontinuities in phase. For example, phase unwrap engine 313 may use the Itoh algorithm to unwrap phase or some other algorithm.

The unwrapped phase values may then be passed to unwrapped phase buffer 314. Unwrapped phase buffer 314 may buffer received unwrapped phase values for a period of time. Data from this buffer may be used to create a BCG for output. Data output engine 315 may construct a data set consisting of BCG data. In some embodiments, the BCG data may be graphically presented, such as in the form of a graph indicative of a heartbeat. Data output engine 315 may also compute various characteristics based on the BCG data. For instance, one calculated characteristic may be the user's heart rate. In some embodiments, data from data output engine 350 may be passed directly to touchscreen 316 and/or speaker 317 for output to a user of mobile device 301. As an example, touchscreen 316 may be used to present a graph of the BCG data. Speaker 317 may be used to output an indication of the user's heart rate, such as a spoken indication of "Your heart rate has been measured as 62 bpm."

Components 311 through 350 may function as part of the background component group 319. Background component group 319 may operate as part of an operating system of mobile device 301 or as part of a low-level application that outputs data to user-installed or higher-level applications, such as applications that have been acquired by user from an "app" store. Therefore, data output engine 315 may output data in a standardized format that can be used by multiple applications. For instance, an API may be present that allows applications to obtain BCG data from background component group 319.

Components 311 through 315 may be software that is executed using one or more general-purpose processors of processing module 310. In other embodiments, components 311 through 315 may be implemented using specialized hardware that performs the functions as previously described. In still other embodiments, some of these components may be implemented using software while others may be implemented using firmware or hardware. Additionally or alternatively, any of components 311 through 315 may be executed remotely as part of cloud server system 350. Therefore, while radar IC 305 at mobile device 301 may be used to capture raw radar waterfall data, some or all of that raw waterfall data may be passed to cloud server system 350 via network interface 303 and network 340.

Machine Learning (ML)—based analysis application 320 can represent a specialized application that may be installed on mobile device 301 to present BCG data and/or analyze BCG data for a specific heart related condition. ML-based analysis application 320 may come pre-installed on mobile device 301 or may be installed by a user. ML-based analysis application 320 may be executed in the cloud by cloud server system 350 or some other cloud server system. For example, a user may desire that his BCG data be screened for a particular heart-related problem. The user may acquire ML-based analysis application 320 from an application store or some other source. ML-based analysis application 320 may include a machine learning model that has been trained using a set of training data to screen for the particular heart related problem. For example, BCG data of a large population of people who later had a heart attack and a large population that later did not have a heart attack may be used to train the machine learning model. The user's BCG data obtained from data output engine 315 may be analyzed by ML-based analysis application 320 to classify whether the users BCG data is more likely representative of a person who later had a heart attack or later did not have a heart attack. ML-based analysis application 320 may present an interface via touchscreen 316 and/or speaker 317 there which a user can interact with ML-based analysis application 320. In other embodiments, applications that are not machine learning based may also be possible.

Figure 4:
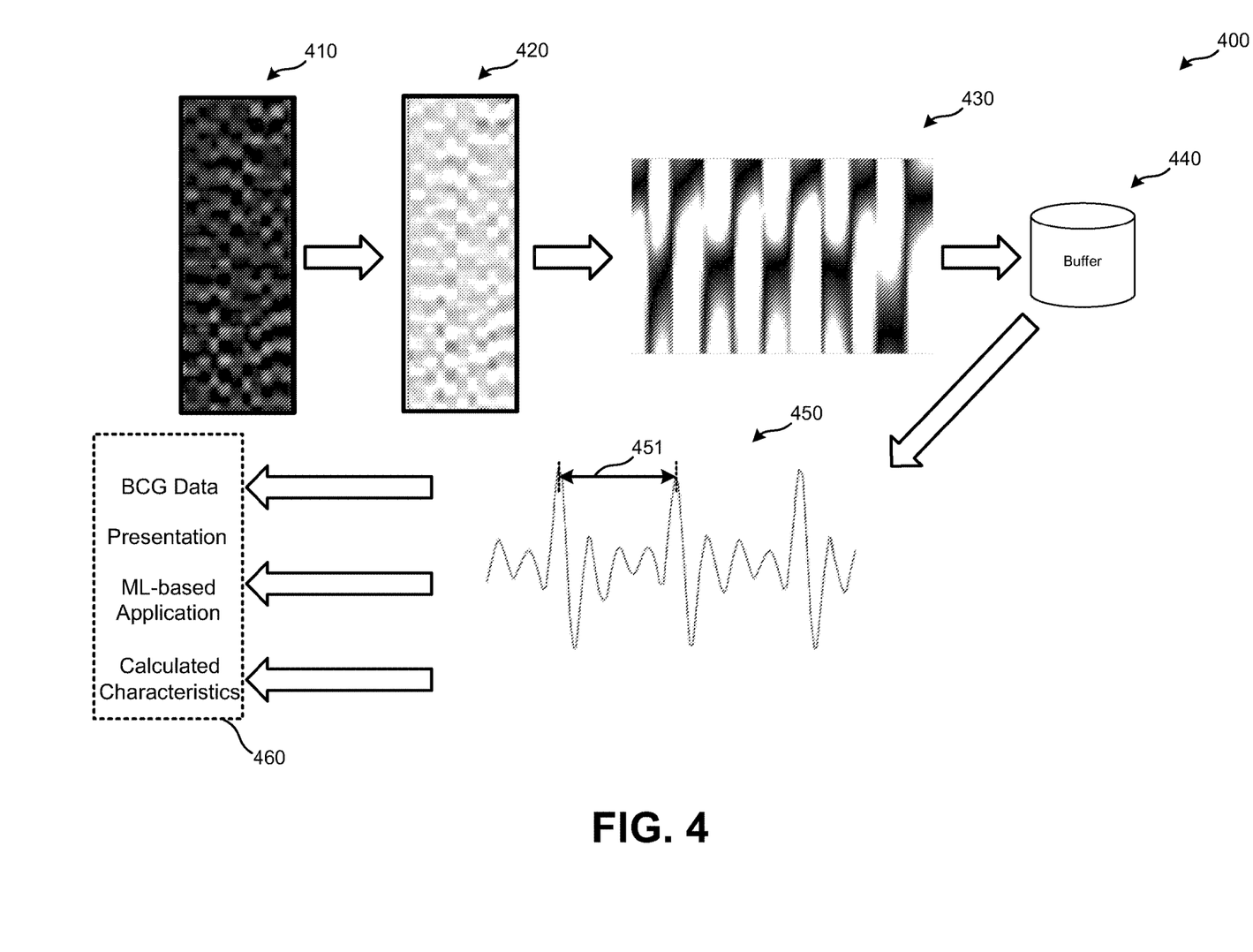
FIG. 4 illustrates an embodiment of raw radar data being converted into heartbeat measurements.

FIG. 4 illustrates an embodiment 400 of raw received radar data being converted into BCG data, such as by the embodiments of FIGS. 1-3. A raw waterfall of radar data 410 may be output by the radar IC. A processing system may filter the raw waterfall of radar data 410 to obtain a foreground waterfall of radar data 420 that only includes data determined to correspond to moving objects. Based upon computing the differences in phase of received chirps present within the foreground waterfall of radar data 420, changes in phase can be determined. These changes in phase can be reflective of an amount of movement with the user's body due to a user's heartbeat. This data may be buffered using buffer 440, which includes one or more non-transitory processor readable mediums. Data from buffer 440 may then be used to construct BCG representation 450, which can include time on the x-axis and amplitude on the y-axis. BCG representation 450 may be output for presentation, such as to a display screen of the user's device. Additionally or alternatively, the data from buffer 440 may be either output as BCG data as output 460 in its raw form or may be used to calculate various characteristics. For instance, the peak-to-peak time period 451 may be used to calculate a heartrate of the user. Such a calculated heartrate may be output as one of calculated characteristics. BCG data may be output to an ML-based application where further processing can be performed, such as to determine if the user is suffering from or susceptible to particular types of heart conditions.

Figure 5:
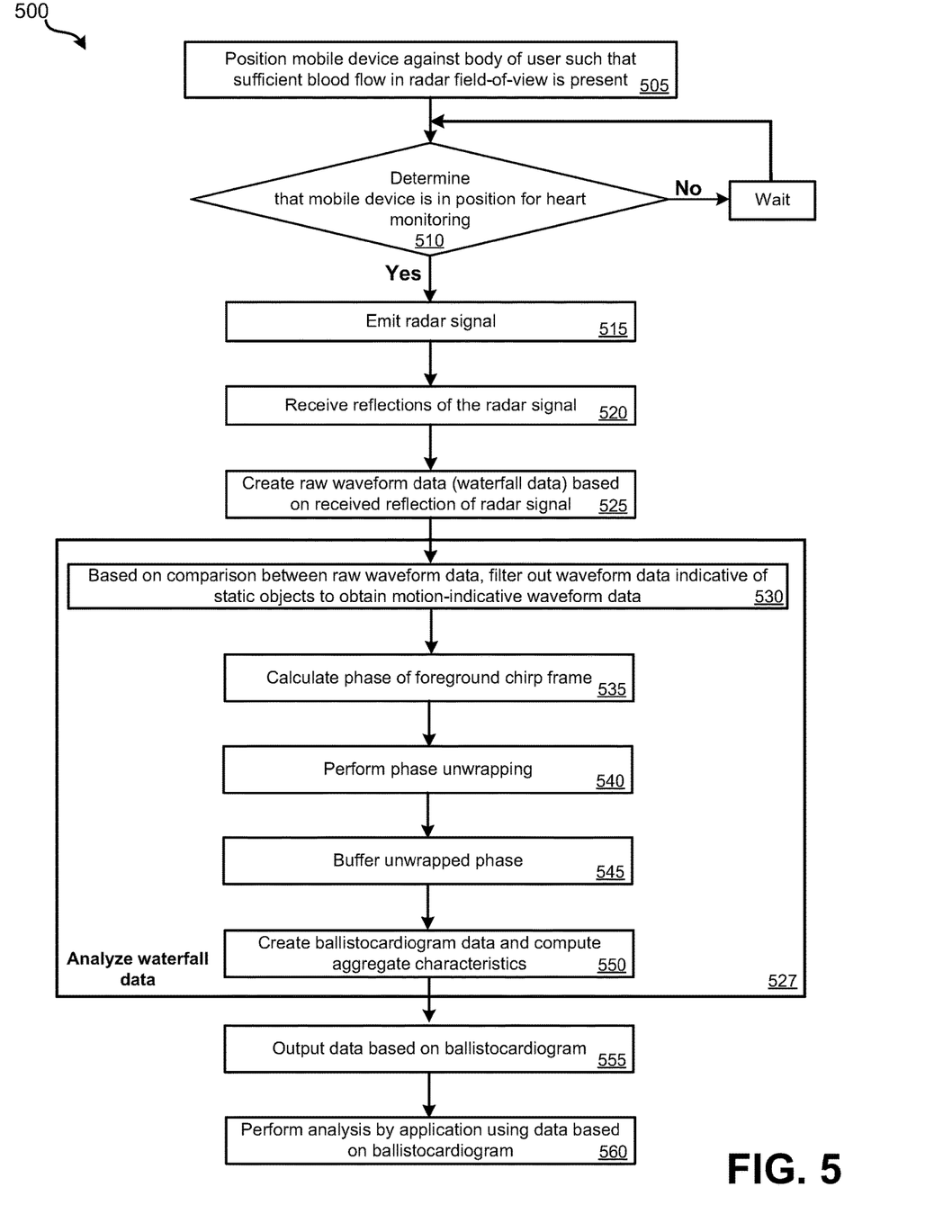
FIG. 5 illustrates an embodiment of a method for heart health measurements and analysis.

Various methods may be performed using the systems and devices detailed in relation to FIGS. 1-3. FIG. 5 illustrates an embodiment of a method 500 for heartbeat tracking. Method 500 may be performed by a mobile device, such as mobile device 301, or by a system that includes a mobile device and cloud server system, such as system 300.

At block 505, the mobile device may be positioned such that the radar IC of the mobile device is held against the body of the person for whom BCG data is to be collected. For instance, the mobile device may be held against a chest of the user, such that the radar IC is pressed against the skin of the user or pressed against the clothing of the user. Other parts of the users body is also possible, such as an arm, leg, or neck. An example of how a user may hold the mobile device is presented in FIG. 2.

At block 510, a determination may be made whether the mobile device is being held in position for heart measurements. The determination of block 510 can be performed either using radar (e.g., determine if a pulse is detected) or some other presence detection technology, such as passive infrared presence detection (e.g., determine if device is being held against a body) or an accelerometer (e.g., to determine if the angle at which the mobile device is being held is correct). If the mobile device is not in position at block 510, the mobile device may continue to monitor for the mobile device being placed in the proper location for heart monitoring. If the mobile device is determined in position for heart monitoring, method 500 may proceed to block 515.

At block 515, radio waves, or more generally, electromagnetic radiation, may be emitted. Radio waves may be emitted at between 40 GHz and 80 GHz. In some embodiments, radio waves are emitted around 60 GHz. The emitted radio waves may be frequency modulated continuous wave (FMCW) radar. At block 520, reflections of the emitted radio waves may be received off of objects present within the field-of-view of the radar IC. Since the radar IC is being held against the user, the objects off which reflected radio waves are received may be a surface of the user or internal vessels of the user. The reflections may be received via one or more antennas of the radar IC (or via antennas separate from the radar processing circuitry).

At block 525, raw waveform data, which can be referred to as raw waterfall data, may be created and output by the radar IC. In some embodiments, a separate set of raw waterfall data is output for each antenna. The raw waterfall data is based on the received reflections of the emitted radio waves. The raw waterfall data may be provided to a processing system that will analyze the raw waterfall data, such as for heart monitoring.

At block 527, the waterfall data may generally be processed to obtain BCG data. The processing may be performed locally using a processing system of the smart-home device or may be performed remotely in the cloud by a cloud-based server system. At block 530, the raw waveform data may be buffered for a period of time, such as between one and 10 seconds. The raw waveform data may have an adaptive background subtraction process applied. This background subtraction process may identify static portions of the raw waterfall data and remove such portions such that a raw foreground waterfall is created that corresponds to movement within the field-of-view of the radar IC.

At block 535, the relative phase differences of received chirps within the foreground waterfall data may be determined by comparing the received chirps. As the body of the user (both internally and externally) moves due to the user's heartbeat, the phase of the received chirps within the foreground waterfall data will vary. At block 540, a phase unwrapping process may be performed as previously detailed.

At block 545, the unwrapped phase may be buffered. These unwrapped phase values may be used to create ballistocardiogram data and/or compute characteristics related to the user's heart health, such as the user's heartrate (e.g., in beats per minute) by determining the amount of time between peaks in detected movement.

At block 555, the BCG data and/or characteristics may be output. In some embodiments, the BCG data and/or computed characteristics may be output for presentation by the mobile device to a user. Additionally or alternatively, the BCG data and/or characteristics may be recorded, either locally at the mobile device or remotely at the cloud-based server system. Such recording can allow a user to track his heart health over time and monitor for long-term trends in his heart health. Additionally or alternatively, the BCG data and/or characteristics may be output to another application, such as via an API or software development kit (SDK). The separate application, which may be used installed, may be configured to detect particular health conditions, such as heart conditions, by performing an analysis at block 560.

Such applications may use a trained machine learning model to detect one or more particular conditions based on the user's BCG data and/or calculated characteristics. For instance the ML-based application may have a static model present within the locally-installed application or may use a dynamic or static ML model maintained by a remote cloud-based server system. Based upon the received BCG data, a classification can be performed using the machine-learning model that indicates whether the user has or is at risk for a particular heart condition. Such an arrangement can allow a user to obtain one or more applications to monitor for particular heart health conditions.

As part of block 560, a result of the classification may be output. For instance, the mobile device may be caused to present the result of the classification performed using the machine-learning model. As a simple example, an output may indicate whether the user is at an elevated risk for a heart attack based on the user's BCG data (possibly in combination with other data provided by the user, such as age, weight, height, sex, race, etc.).

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A smartphone, comprising:
    a housing;
    a display screen housed by the housing;
    a radar integrated circuit housed by the housing such that an antenna array of the radar integrated circuit is configured to emit radio waves into an ambient environment of the smartphone in front of the display screen and the radar integrated circuit is configured to receive reflected radio waves from the ambient environment; and
        output a raw radar waterfall based on the received reflected radio waves;
    one or more processors that are in communication with the display screen and the radar integrated circuit, wherein the one or more processors are configured to:
        receive the raw radar waterfall from the radar integrated circuit;
        analyze the raw radar waterfall to create a ballistocardiography waveform, wherein the one or more processors being configured to analyze the raw radar waterfall comprises the one or more processors being configured to:

perform a background clutter removal process that removes radar data from the raw radar waterfall attributed to a static object to create a foreground radar waterfall;
determine relative phase differences of foreground chirp frames present within the foreground radar waterfall; and
perform a phase unwrapping process on the determined relative phase differences to create the ballistocardiography waveform; and
output data based on the ballistocardiography waveform.

2. The smartphone of claim 1, wherein the radar integrated circuit is located behind a top bezel of the housing of the smartphone.

3. The smartphone of claim 1, wherein the radar integrated circuit emits frequency-modulated continuous-wave radar (FMCW).

4. The smartphone of claim 1, wherein the data based on the ballistocardiography waveform is output to an application executed by the smartphone.

5. The smartphone of claim 4, further comprising a non-transitory processor-readable medium on which the application is installed, wherein the application comprises a machine learning component that is trained to detect a heart condition based on the ballistocardiography waveform.

6. The smartphone of claim 1, wherein the one or more processors being configured to output data based on the ballistocardiography waveform comprises the one or more processors being configured to cause the ballistocardiography waveform to be presented on the display screen of the smartphone.

7. The smartphone of claim 1, wherein:
the one or more processors are further configured to analyze the ballistocardiography waveform to determine a heartrate; and
the one or more processors being configured to output data based on the ballistocardiography waveform comprises outputting the heartrate.

8. The smartphone of claim 1, further comprising a proximity sensor, wherein the one or more processors are further configured to determine a front surface of the smartphone through which the antenna array of the radar integrated circuit is pointed to the ambient environment is placed against a body part of a user.

9. A method for performing ballistocardiography, the method comprising:
emitting, by a radar integrated circuit of a mobile device, frequency-modulated continuous-wave (FMCW) radar;
receiving, by the radar integrated of the mobile device, reflected radio waves based on the FMCW radar being reflected off objects to create a raw radar waterfall;
analyzing, by the mobile device, the raw radar waterfall to create a ballistocardiography waveform, wherein analyzing the raw radar waterfall comprises:
performing a background clutter removal process that removes radar data from the raw radar waterfall attributed to a static object to create a foreground radar waterfall;
determining relative phase differences of foreground chirp frames present within the foreground radar waterfall; and
performing a phase unwrapping process on the determined relative phase differences to create the ballistocardiography waveform;
outputting, by the mobile device, data based on the ballistocardiography waveform to a machine-learning application installed on the mobile device;
classifying, using the machine-learning application, the ballistocardiography waveform based on a trained machine-learning model of the machine-learning application; and
outputting, by the mobile device, an indication of a classification based on the classifying the ballistocardiography waveform.

10. The method for performing ballistocardiography of claim 9, wherein outputting data based on the ballistocardiography waveform comprises outputting the data based on the ballistocardiography waveform to the machine-learning application that was installed by a user on the mobile device.

11. The method for performing ballistocardiography of claim 10, wherein the machine-learning application comprises a machine-learning model trained to detect a particular heart condition.

12. The method for performing ballistocardiography of claim 9, wherein outputting data based on the ballistocardiography waveform comprises causing the ballistocardiography waveform to be presented on a display screen of the mobile device.

13. The method for performing ballistocardiography of claim 9, further comprising:
analyzing the ballistocardiography waveform to determine a heartrate, wherein outputting data based on the ballistocardiography waveform comprises outputting an indication of the determined heartrate.

14. The method for performing ballistocardiography of claim 9, further comprising determining a surface of the mobile device through which an antenna array of the radar integrated circuit is pointed to the ambient environment is placed against a body part of a user.

15. A non-transitory processor-readable medium comprising processor-readable instructions configured to cause one or more processors to:
cause frequency-modulated continuous-wave (FMCW) radio waves to be emitted;
create a raw radar waterfall based on received reflected radio waves;
analyze the raw radar waterfall to create a ballistocardiography waveform, wherein the processor-readable instructions configured to analyze the raw radar waterfall comprises processor-readable instructions that cause the one or more processors to:
perform a background clutter removal process that removes radar data from the raw radar waterfall attributed to a static object to create a foreground radar waterfall;
determine relative phase differences of foreground chirp frames present within the foreground radar waterfall; and
perform a phase unwrapping process on the determined relative phase differences to create the ballistocardiography waveform; and
output data based on the ballistocardiography waveform.

* * * * *